(12) United States Patent
Iwasaki et al.

(10) Patent No.: US 6,615,487 B2
(45) Date of Patent: Sep. 9, 2003

(54) METHOD FOR MANUFACTURING VALVE TIMING ADJUSTING APPARATUS

(75) Inventors: Kazutoshi Iwasaki, Nagoya (JP); Masayasu Ushida, Okazaki (JP); Sanemasa Kawabata, Kariya (JP); Yoshio Matsumoto, Inabe-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/968,938

(22) Filed: Oct. 3, 2001

(65) Prior Publication Data

US 2002/0038501 A1 Apr. 4, 2002

(30) Foreign Application Priority Data

Oct. 4, 2000 (JP) .................................... 2000-304943
Jul. 31, 2001 (JP) .................................... 2001-231690

(51) Int. Cl.$^7$ ............................................. B23P 15/00
(52) U.S. Cl. .................................. 29/888.01; 29/527.6
(58) Field of Search ........................ 29/888.01, 527.1, 29/527.6; 123/90.15, 90.17, 90.31, 90.33, 90.34, 90.37; 74/568 R; 464/1, 2, 160

(56) References Cited

U.S. PATENT DOCUMENTS

| | | | | |
|---|---|---|---|---|
| 4,858,572 A | * | 8/1989 | Shirai et al. ............. | 123/90.12 |
| 5,361,735 A | * | 11/1994 | Butterfield et al. ...... | 123/90.17 |
| 5,450,825 A | * | 9/1995 | Geyer et al. ............. | 123/90.17 |
| 5,666,914 A | * | 9/1997 | Ushida et al. ........... | 123/90.17 |
| 5,875,750 A | | 3/1999 | Iwasaki et al. | |
| 5,960,757 A | * | 10/1999 | Ushida ..................... | 123/90.17 |
| 6,006,709 A | * | 12/1999 | Ushida ..................... | 123/90.17 |
| 6,053,139 A | * | 4/2000 | Eguchi et al. ........... | 123/90.17 |
| 6,176,210 B1 | * | 1/2001 | Lichti et al. ............. | 123/90.17 |
| 6,199,524 B1 | * | 3/2001 | Ushida ..................... | 123/90.17 |
| 6,276,321 B1 | * | 8/2001 | Lichti et al. ............. | 123/90.17 |
| 6,334,414 B1 | * | 1/2002 | Okada et al. ............ | 123/90.15 |
| 6,439,183 B1 | * | 8/2002 | Iwasaki et al. ........... | 123/90.17 |

* cited by examiner

*Primary Examiner*—I Cuda-Rosenbaum
(74) *Attorney, Agent, or Firm*—Nixon & Vanderhye, P.C.

(57) ABSTRACT

A base material of a peripheral wall and a vane rotor is formed by extrusion molding an aluminum alloy and cutting an extrusion molded article to the desired length. Further, the extrusion molded article can be molded with high accuracy by extracting the aluminum alloy after extrusion. Preferably, 6000 system of Al—Mg—Si is used as an aluminum alloy. The cutting process and polishing process are applied to the roughly molded base material to form the peripheral wall and the vane rotor. By varying the length to be cut, the volume of each retard hydraulic chamber and each advance hydraulic chamber are adjusted. When the volume of the hydraulic chambers are adjusted, the torque for relatively rotating and driving the vane rotor with respect to the housing member can be changed even pressure of working oil is the same.

17 Claims, 10 Drawing Sheets

METHOD FOR MANUFACTURING VALVE TIMING ADJUSTING APPARATUS

CROSS REFERENCE TO RELATED APPLICATION

This application is based on and incorporates herein by reference Japanese Patent Application Nos. 2000-304943 filed on Oct. 4, 2000, and 2001-231690 filed on Jul. 31, 2001.

BACKGROUND OF THE INVENTION

1. Field of the Invention

The present invention relates to a method for manufacturing a valve timing adjusting apparatus for changing a valve timing of an internal combustion engine.

2. Description of Related Art

In a conventional vane type valve timing adjusting apparatus, a vane member rotating together with a camshaft is housed relatively rotatably within a housing member receiving a drive force from a crank-shaft of the engine. A phase of the vane member with respect to the housing member, that is, a phase difference caused by the relative rotation of the crank-shaft and the camshaft is hydraulically controlled, thereby adjusting the valve timing of at least one of an intake valve and an exhaust valve.

The housing member and the vane member are manufactured by cutting an article obtained by sintering iron, or an article obtained by molding aluminum by way of die-casting or forging.

Torque for relatively rotating and driving the housing member and the vane member by the fluid pressure differs in accordance with an engine size. The torque can be set by adjusting the volume of a fluid chamber.

However, in the molding by way of sintering, die-casting or forging, it is necessary to prepare different molds for changing the volume of the fluid chamber, and perform molding for every mold. Thus, in the production by way of sintering, die-casting or forging, the cost of manufacturing molds increases due to the increase of the number of molds. Further, the arranging steps for preparing different molds for every different torque are increased.

Portions removed of a molded body molded by die-casting or forging are shown in FIGS. 16 and 17. The cross-hatching area shows the portion to be removed.

FIGS. 15A and 15B show a removed portion which is removed when a housing member and a vane member are made by die-cast molding. Gate residues 301, 311, squeeze residues 302, 312, and pattern-draw slope portions 303, 313 are removed from a die-cast molded body 300 of a housing member and a die-cast molded body 310 of a vane member.

FIGS. 16A and 16B shows a portion which is removed when a housing member is made by forging. A surface portion 321 on the forging side, an inner wall portion 322 of a peripheral wall and a side wall, and a through-hole portion 323 are removed from a forge-molded body 320 of the housing member.

FIGS. 17A and 17B show a portion which is removed when a vane member is made by forging. A bottom portion 331 of forging and a surface portion 332 of forging are removed from a forge-molded body 330 of a vane member.

As described above, in the die-cast molding, there are many portions removed by cutting such as gate part, squeeze residues and pattern-draw slopes. In the forge-molding, there are many portions removed by cutting after forging. Accordingly, materials are wasteful, and the number of manufacturing processes increases.

Conventionally, in a case where one of side walls and the peripheral wall of the housing member are integrally modled by die-casing, and the vane member is made of die-casting material, an aluminum material containing 7–12% of Si is used due to the readiness of die-casting. When the aluminum material containing 7–12% of Si is used, the agglutination between aluminums might occur in the sliding portion between the inner surface of the side wall of the housing member and the side surface of a vane rotor. It is necessary to apply Sn plating on the sliding spot and to apply the surface treatment such as coating of alumite or fluorine resin for preventing the agglutination of the sliding part.

SUMMARY OF THE INVENTION

An object of the present invention is to provide a method for manufacturing a valve timing adjusting apparatus in which the number of manufacturing steps is reduced and the drive torque by way of the working fluid is easily adjusted.

According to the present invention, light metal is used, and an extruded molded article is cut into the desired length to form a molded article of at least one of the peripheral wall of a housing and a vane member. Therefore, a member different in the length of a rotational shaft can be manufactured by the same extrusion mold. By adjusting the length of the rotational shaft, the volume of a housing chamber is set to change the torque of the working fluid for relatively rotating and driving the vane member with respect to the housing member. Accordingly, in a case where a valve timing adjusting apparatus according to the different torque is manufactured, the number of steps for the manufacture of molds can be reduced. Preferably, light metal used as an extrusion material is an alloy of aluminum, magnesium or copper.

Further, since the cutting process amount after molding can be reduced as compared with molding by way of forging and die-casting, wastefulness of material and the number of manufacturing steps are reduced.

BRIEF DESCRIPTION OF THE DRAWINGS

Additional objects and advantages of the present invention will be more readily apparent from the following detailed description of preferred embodiments thereof when taken together with the accompanying drawings in which:

FIG. 15A shows a housing member, and FIG. 15B shows a portion removed of a vane rotor (prior art);

FIG. 16A is a front view, and FIG. 16B is a cross-sectional view taken along line XVIB—XVIB in FIG. 16A (prior art), FIG. 17A is a front view, and FIG. 17B is a cross-sectional view taken along line XVIIB—XVIIB in FIG. 17A (prior art).

DETAILED DESCRIPTION OF PREFERRED EMBODIMENTS

First Embodiment

Figure 1:
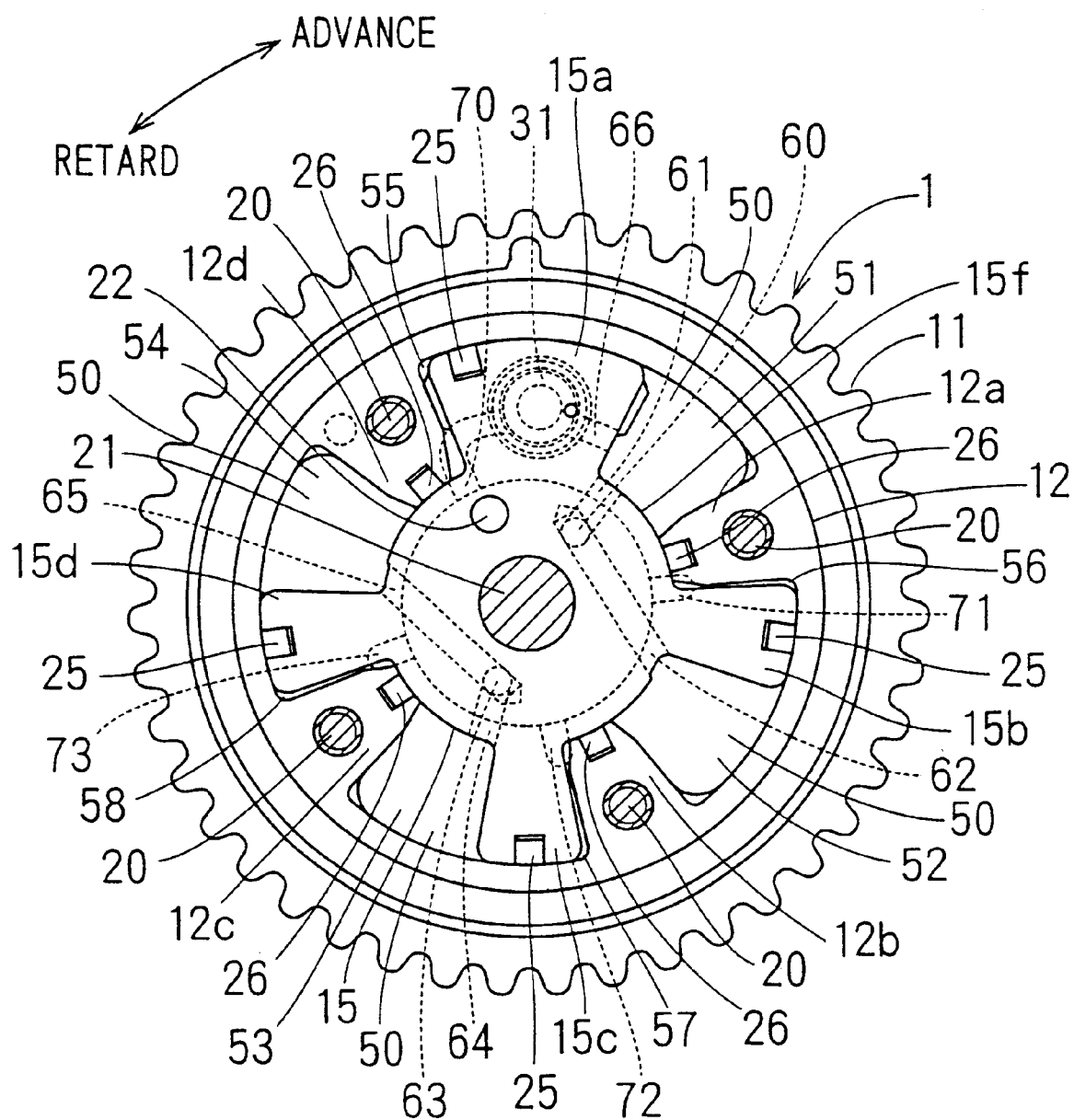
FIG. 1 is a cross-sectional view take along line I—I in FIG. 2, showing a valve timing adjusting apparatus (first embodiment)
Figure 2:
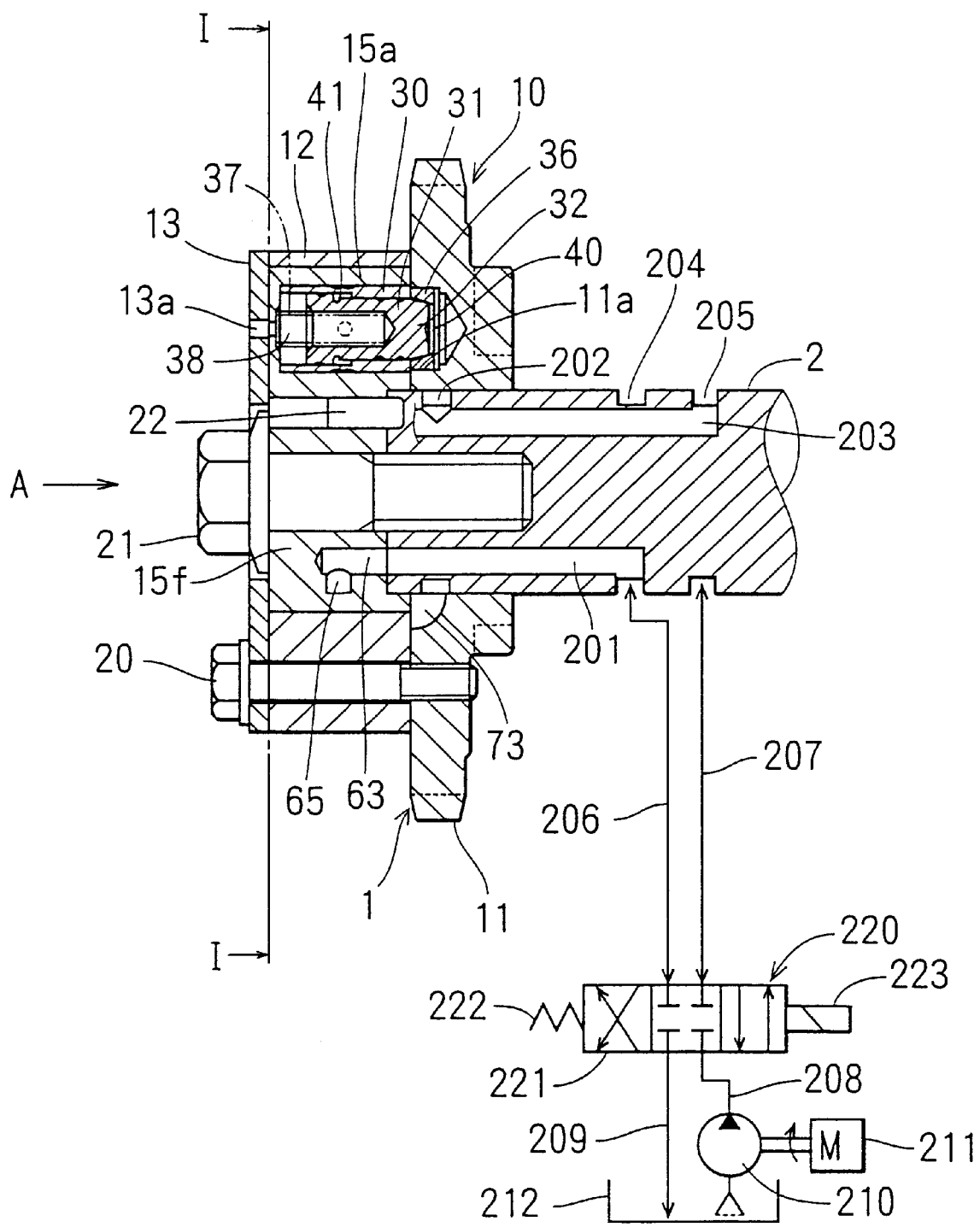
FIG. 2 is a longitudinal cross-sectional view showing the valve timing adjusting apparatus (first embodiment)

A valve timing adjusting apparatus 1 for an engine according to a first embodiment is shown in FIGS. 1 and 2. FIG. 2 is a longitudinal cross-sectional view taken by cutting a line passing through a stopper piston 31, a pin 22, a bolt 21, an oil passage 63 and a bolt 20 in FIG. 1. The valve timing adjusting apparatus 1 is of a hydraulic control type and is to adjust the valve timing of an intake valve.

As shown in FIG. 2, a housing member 10 as a driving side rotor has a chain sprocket 11 as one side wall, a peripheral wall 12 and a front plate 13 as the other side wall. the chain sprocket 11 and the front plate 13 are connected to the peripheral wall 12 at both sides in the axial direction. The chain sprocket 11, the peripheral wall 12 and the front plate 13 are secured coaxially by the bolt 20. The chain sprocket 11 is coupled with the crank-shaft as a driving shaft of the engine (not illustrated) by a chain (not illustrated) to which the driving force is transmitted, and rotates in synchronism with the crank shaft.

To a camshaft 2 as a driven side shaft, the driving force of the crank-shaft is transmitted through the valve timing adjusting apparatus 1 to open and close the intake valve. The camshaft 2 is rotatable with a fixed phase difference with respect to the chain sprocket 11. The housing member 10 and the camshaft 2 rotate clockwise as viewed in the direction of arrow A shown in FIG. 2. This rotating direction will be hereinafter referred to as the advance direction.

As shown in FIG. 1, the peripheral wall 12 includes shoes 12a, 12b, 12c and 12d as partitioning parts arranged substantially at equal intervals in the rotational direction and formed in a trapezoid. The inner peripheral surfaces of the shoes 12a, 12b, 12c and 12d are formed to be an arc in cross section. Corners on both sides of the shoes 12a–12d in the rotational direction facing a boss portion 15f of a vane rotor 15 are cut so as not to come in contact with vanes 15a, 15b, 15c and 15d. The spaces formed in four places in the rotational direction by the shoes 12a, 12b, 12c and 12d are formed as fan-shaped housing chambers 50 for housing the vanes 15a, 15b, 15c and 15d.

The vane rotor 15 has the boss part 15f, and the vanes 15a, 15b, 15c and 15d arranged substantially at equal intervals in the rotational direction on the outer peripheral side of the boss part 15f. The vanes 15a, 15b, 15c and 15d are rotatably housed within the housing chambers 50, respectively. Each vane 15a–15d divides each housing chamber 50 into a retard hydraulic chamber and an advance hydraulic chamber. The arrows representative of the retard direction and the advance direction shown in FIG. 1 represent the retard direction and the advance direction of the vane rotor 15 with respect to the housing member 10. The vane rotor 15 as the driven side rotor comes in contact with the rotational axial end of the camshaft 2 and secured integral with the camshaft 2 by a bolt 21. The positioning of the vane rotor 15 in the rotational direction with respect to the camshaft 2 is performed by the pin 22 shown in FIG. 2.

The housing member 10 and the vane rotor 15 are relatively rotatable. The inner walls at axial both sides of the housing member 10 face and slide on the outer walls at rotational axial both sides of the vane rotor 15. The inner wall of the peripheral wall 12 faces and slides on the outer peripheral wall of the vane rotor 15.

As shown in FIG. 1, seal members 25, 26 are disposed in a sliding clearance formed between the peripheral wall 12 and the vane rotor 15 facing each other in the radial direction. The seal member 25 is fitted in the recess formed in the vanes 15a, 15b, 15c and 15d. The seal member 26 is fitted in the recess formed in the shoes 12a, 12b, 12c and 12d. An appropriate sliding clearance is provided between the outer peripheral wall of the vane rotor 15 and the inner wall of the peripheral wall 12, for preventing working oil from leaking between the hydraulic chambers through the clearance by the seal members 25, 26. The seal members 25, 26 are respectively pressed toward the sliding surfaces facing each other in the radial direction by the bias force of a long plate spring.

As shown in FIG. 2, a cylindrical guide ring 30 is pressed into the vane 15a, and a cylindrical stopper piston 31 as a contact portion is housed slidably in the axial direction into the guide ring 30. A fitting ring 36 as a contacted portion is pressed and held in a depressed portion 11a formed in a chain sprocket 11. The stopper piston 31 comes in contact with and can be fitted in the fitting ring 36. Since the stopper piston 31 and the fitting ring 36 are formed in a tapered fashion, the stopper piston 31 is smoothly fitted in the fitting ring 36. A stopper ring 37 as contact and bias means biases the stopper piston 31 toward the fitting ring 36. The stopper piston 31, the fitting ring 36 and the spring 37 form a restriction means.

Pressure of working oil supplied to a hydraulic chamber 40 and a hydraulic chamber 41 acts in a direction that the stopper piston 31 is slipped out the fitting ring 36. The hydraulic chamber 40 communicates with an advance hydraulic chamber 55 (see FIG. 1), and the hydraulic chamber 41 communicates with a retard hydraulic chamber 51 (see FIG. 1). A tip 32 of the stopper piston 31 can be fitted in the fitting ring 36 when the vane rotor 15 is positioned at the most retard position with respect to the housing member 10. In the state that the stopper piston 31 is fitted in the fitting ring 36, the relative rotation of the vane rotor 15 with respect to the housing member 10 is restricted.

When the vane rotor 15 is rotated from the most retard position to the advance side with respect to the housing member 10, the rotational direction position of the stopper piston 31 and the fitting ring 36 is deviated, so that the stopper piston 31 cannot be fitted in the fitting ring 36.

A communication passage 13a formed in the front plate 13 and a housing hole 38 formed in the opposite side to the fitting ring 36 of the stopper piston 31 communicate with each other when the vane rotor 15 is at the most retard position with respect to the housing member 10. Since the communication passage 13a is opened into the atmosphere, the reciprocating movement of the stopper piston 31 while the vane rotor 15 is at the most retard position is not disturbed.

As shown in FIG. 1, a retard hydraulic chamber 51 is formed between the shoe 12a and the vane 15a, a retard hydraulic chamber 52 is formed between the shoe 12b and the vane 15b, a retard hydraulic chamber 53 is formed between the shoe 12c and the vane 15c, a retard hydraulic chamber 54 is formed between the shoe 12d and the vane 15d. Further, an advance hydraulic chamber 55 is formed between the shoe 12d and the vane 15a, an advance hydraulic chamber 56 is formed between the shoe 12a ad the vane 15b, an advance hydraulic chamber 57 is formed between the shoe 12b and the vane 15c, and an advance hydraulic chamber 58 is formed between the shoe 12c and the vane 15d.

As shown in FIG. 2, annular groove oil passages 204, 205 are formed in the outer peripheral wall of the camshaft 2. The camshaft 2 is further includes oil passages 200, 201 (the oil passage 200 is not illustrated) in communication with the groove oil passage 204. An oil passage 203 is formed to communicate with a groove oil passage 205 in an axially extending manner. The oil passages 200, 201 reach the end on the vane rotor side of the camshaft 2. The oil passage 203 communicates with an annular groove oil passage 202 formed in the outer peripheral wall at the vane rotor side of the camshaft 2.

The groove oil passage 204 and the groove oil passage 205 are connected to a switching valve 220 through an oil passage 206 and an oil passage 207, respectively. An oil supply passage 208 is connected to an oil pump 210 driven by a motor 211, and an oil discharge passage 209 is opened toward a drain 212. An oil pump 210 supplies working oil pumped up from the drain 212 to the hydraulic chambers through the switching valve 220.

A valve member 221 of the switching valve 220 is biased in one direction by a spring 222, and is reciprocated by controlling energization to a solenoid 223. The energization to the solenoid 223 is controlled by an engine control unit (ECU) (not illustrated). The reciprocation of the valve member 221 switches the communication and the shutting off of communication among the oil passages 206, 207, the oil supply passage 208 and the oil discharge passage 209.

The vane rotor 15 is provided with oil passages 60, 63 from the side to which working oil is supplied from the camshaft 2 to the rotational axial halfway. The oil passage 60 communicates with the oil passage 200, and the oil passage 63 communicates with the oil passage 201. Distribution oil passages 61, 62 communicating with the oil passage 60 and distribution oil passages 64, 65 communicating with the oil passage 63 are bored and formed from the outer peripheral side of the boss part 15f. The distribution oil passage 61, the distribution oil passage 62, and the distribution oil passage 64 are communicated with the retard hydraulic chamber 52, the retard hydraulic chamber 53, and the retard hydraulic chamber 54, respectively. The distribution oil passages 61, 62, 64 and 65 are opened to the roots of the vanes. Further, an oil passage 66 for allowing the retard hydraulic chamber 51 to communicate with the hydraulic chamber 41 is formed in the vane 15a.

Advance oil passages 70, 71, 72 and 73 are formed substantially at intervals of 90 degrees in the center portion of the inner side wall of the chain sprocket 11 on the side to which the working oil is supplied from the groove oil passage 202 formed in the camshaft 2. The advance oil passage 70, the advance oil passage 71, the advance oil passage 72, the advance oil passage 73 are communicated with the advance hydraulic chamber 55, the advance hydraulic chamber 56, the advance hydraulic chamber 57, and the advance hydraulic chamber 58, respectively.

With the above-described oil passage configuration, the working oil can be supplied from the oil pump 210 to the retard hydraulic chambers 51, 52, 53, 54, the retard hydraulic chambers 55, 56, 57, 58, and the hydraulic chambers 40, 41. The working oil can be discharged from the hydraulic chambers to the drain 212.

Next, an operation of the valve timing adjusting apparatus 1 will be explained.

Since the stopper piston 31 is out of the fitting ring 36 by oil pressure of the working oil supplied to the hydraulic chamber 40 or the hydraulic chamber 41, during normal operation of the engine, the vane rotor 15 is relatively rotatable with respect to the housing member 10. A phase difference of the camshaft 2 with respect to the crank-shaft is adjusted by controlling the oil pressure applied to each hydraulic chamber.

When the engine is stopped, the solenoid 223 is energized for a predetermined period of time whereby the valve member 221 shown in FIG. 2 is moved leftwardly to allow the oil passage 207 to communicate with the oil supply passage 208 to rotate the vane rotor 15 to the advance position with respect to the housing member 10. Since the average of the variation torque received by the camshaft 2 acts in the retard side, when the energization of the solenoid 223 is turned off, the vane rotor 15 rotates from the most advance position to the retard side by the variation torque received by the camshaft 2 till the engine stops. At the most retard position, the stopper piston 31 is fitted in the fitting ring 36 by the bias force of the spring 37. When the stopper piston 31 is fitted in the fitting ring 36, the relative rotation of the vane rotor 15 with respect to the housing member 10 is restrained.

Even when the engine is restarted, the working oil is not supplied to the hydraulic chamber 41 and the hydraulic chamber 40 until the working oil is supplied to the retard hydraulic chambers 51, 52, 53, 54, and the advance hydraulic chambers 55, 56, 57, 58. Therefore, the stopper piston 31 remained fitted in the fitting ring 36, and the camshaft 2 is held at the most retard position with respect to the crank-shaft. Thus, the vane rotor 15 is prevented from colliding with the housing member 10 due to the variation torque acting on the camshaft 2 till the working oil is supplied to the respective hydraulic chambers.

When the working oil is supplied to each retard hydraulic chamber or each advance hydraulic chamber, and the working oil is supplied to the hydraulic chamber 41 or the hydraulic chamber 40, the stopper piston 31 receives the force leftwardly in FIG. 1, so that the stopper piston 31 is slipped out of the fitting ring 36 against the bias force of the spring 37. By this, the restriction of the housing member 10 and the vane rotor 15 is released, and the vane rotor 15 relatively rotates with respect to the housing member 10 by the working oil applied to the retard hydraulic chambers 51, 52, 53, 54 and the advance hydraulic chambers 55, 56, 57, 58. The relative phase difference of the camshaft 2 with respect to the crank-shaft is adjusted.

Figure 3:
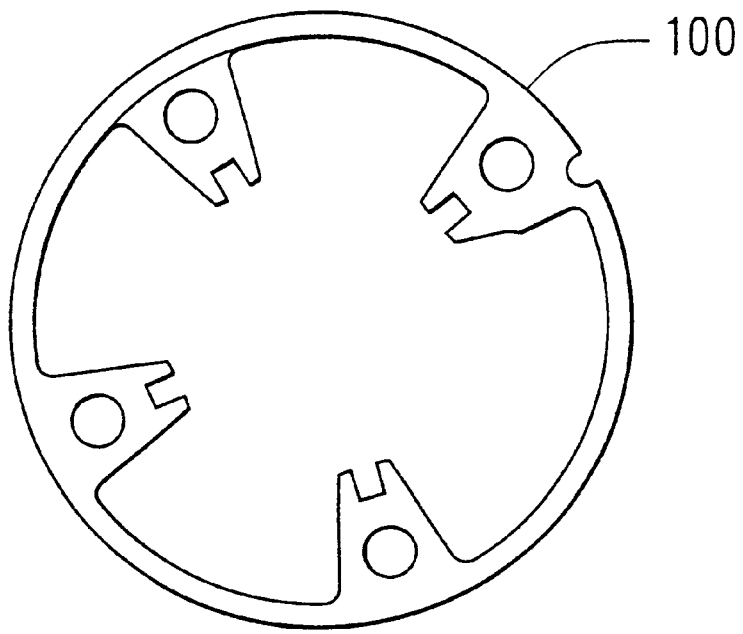
FIG. 3 is a front view showing a base material of a peripheral wall (first embodiment)
Figure 4:
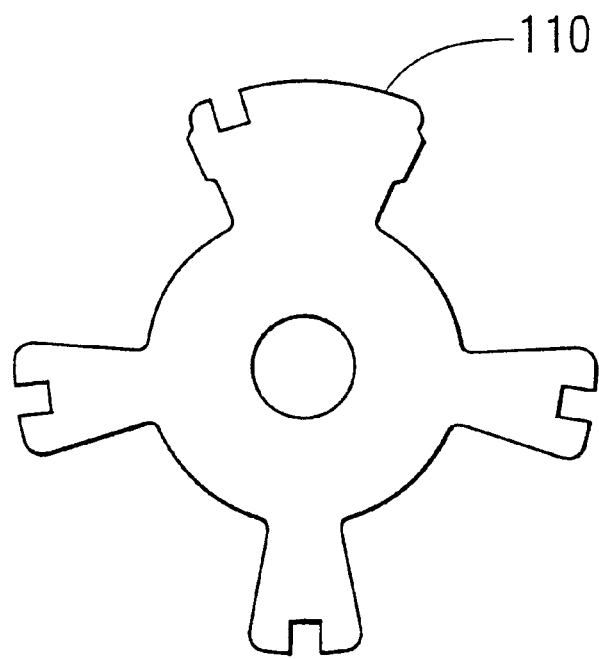
FIG. 4 is a front view showing a base material of a vane rotor according (first embodiment)

Next, a process of manufacturing the peripheral wall 12 and the vane rotor 15 will be explained. FIG. 3 shows a base material 100 for the peripheral wall 12, and FIG. 4 shows a base material 110 for the vane rotor 15. Both the base materials 100, 110 are formed by extrusion-molding an aluminum alloy and cutting an extrusion-molded article to the desired length.

Figure 5:
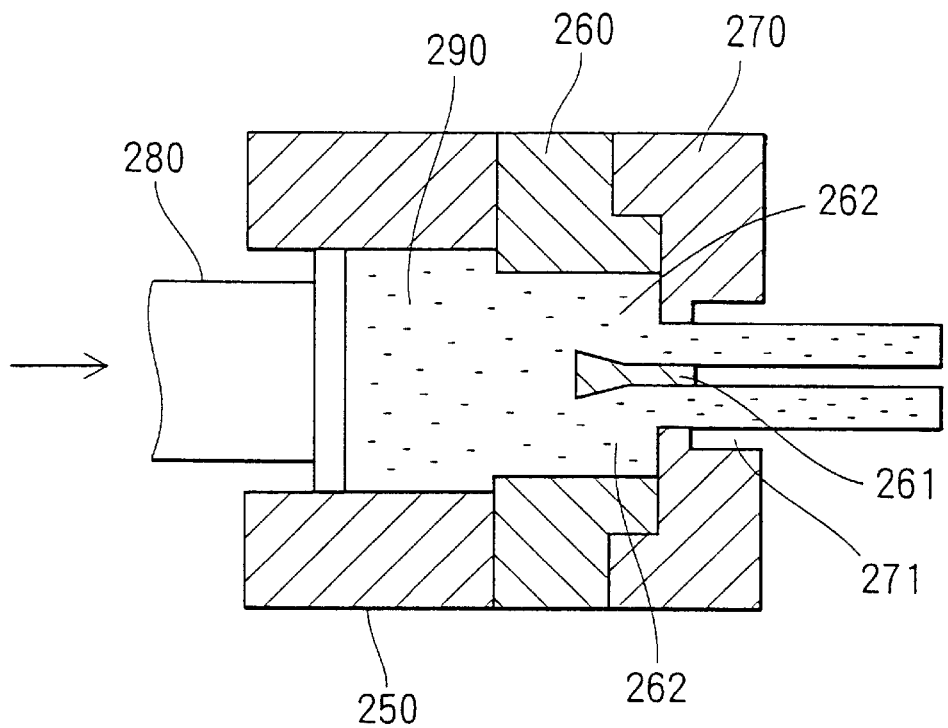
FIG. 5 is a cross-sectional view showing an extrusion molding mold (first embodiment)
Figure 6A:
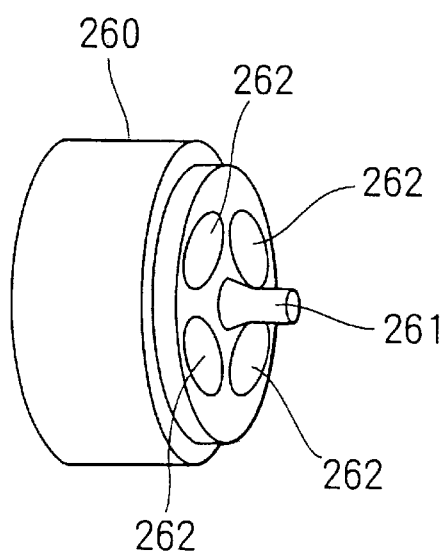
FIG. 6A is a perspective view showing a male die of the extrusion molding mold.
Figure 6B:
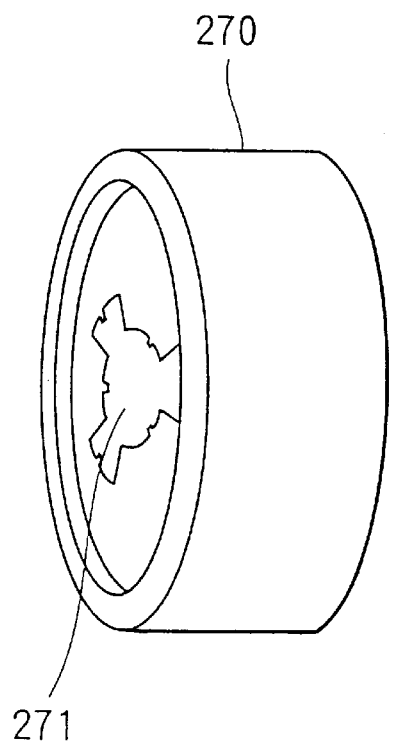
FIG. 6B is a perspective view showing a female die of the extrusion molding mold (first embodiment)

FIGS. 5 and 6 show an extrusion molding mold of the vane rotor 15. A container 250, an extrusion molding male die 260 and a female die 270 are combined as shown in FIG. 5, and an extrusion molding material 290 of an aluminum alloy is pressed-in from the male die 260 side by a pushing ram 280. The male die 260 molds the inner peripheral shape of the vane rotor 15, and the female die 270 molds the outer peripheral shape of the vane rotor 15. An extrusion molding material 290 is divided into four holes 262 of the male die 260, and then extruded to a molding hole 271 of the male die 270 and connected. A pin 261 of the male die 260 molds a hole for the bolt 20.

After the aluminum alloy has been subjected to extrusion molding, the extracting molding is further performed, so that an extrusion molded article can be molded with high accuracy. As the aluminum alloy, preferably, 6000 system alloy of the Al—Mg—Si system alloy is used. Further, alloy of magnesium or copper may be also used in place of the aluminum alloy.

The base materials 100, 110 subjected to rough molding are applied with cutting and polishing processed to form the peripheral wall 12 and the vane rotor 15. Alternatively, in the cutting process, at least one of the inner peripheral wall of the base material 100 and the outer peripheral wall of the base material 110 may not be cut, for forming the peripheral wall 12 and the vane rotor 15. By varying the length to be cut, the volume of the retard hydraulic chamber and the advance hydraulic chamber are adjusted. When the volume of the hydraulic chamber is adjusted, the torque for relatively rotating and driving the vane rotor 15 with respect to the housing member 10 can be changed even the pressure of the working oil is the same.

Further, preferably, the hardness of parts of the base materials 100, 110 sliding with the seal members 25, 26 of the is enhanced by carrying out alumite processing, plating processing or heat treatment of T6 or the like. By enhancing the hardness, the abrasion caused by the sliding with the seal members 25, 26 can be reduced. Preferably, the hardness is more than HRB 45.

In the first embodiment, the base material of the peripheral wall 12 and the vane rotor 15 is formed by the extrusion molding. Alternatively, only one base material of the peripheral wall 12 and the vane rotor 15 may be subjected to the extrusion molding. Further, the vane rotor 15 may be subjected to the extrusion molding, and the peripheral wall 12 of the housing member 10 and the front plate 13 may be subjected to the die-cast molding integrally by ADC12.

Figure 7:
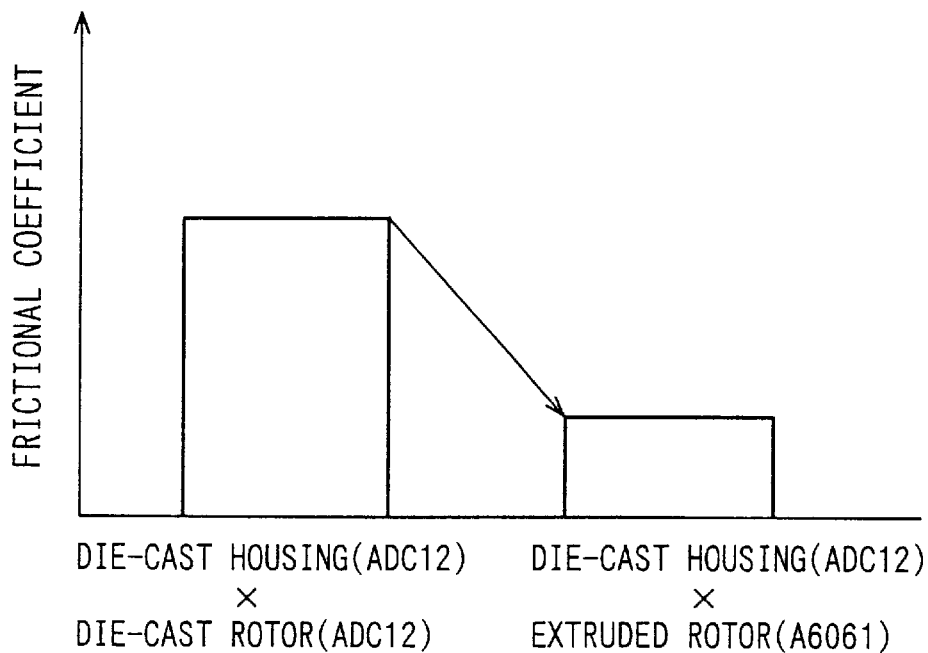
FIG. 7 is an explanatory view showing a magnitude of frictional coefficients in a case where a housing member and a vane rotor are made by die-cast molding, and in a case where a vane rotor is made by extrusion molding (first embodiment)
Figure 8:
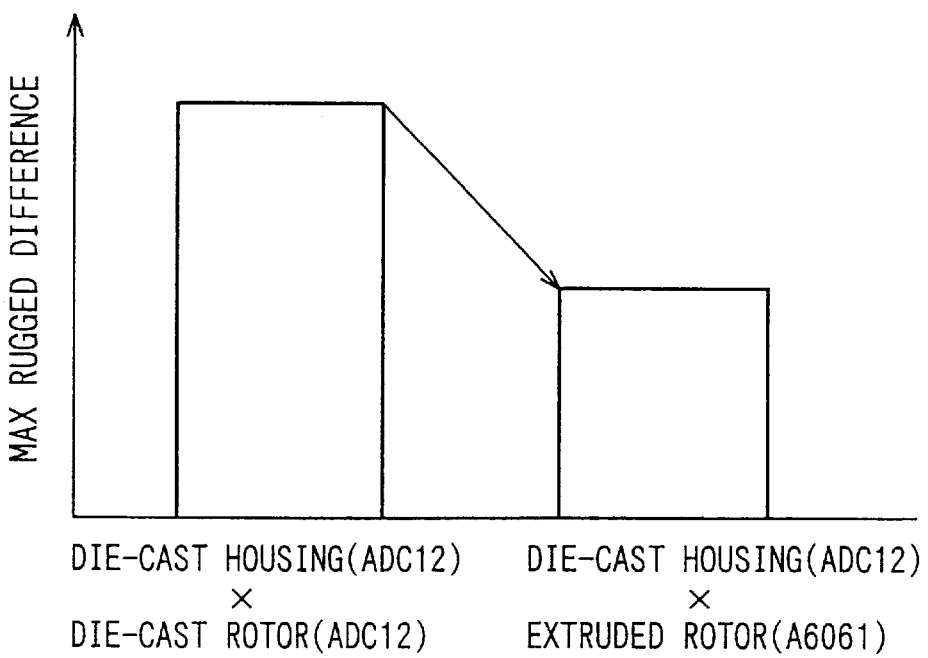
FIG. 8 is an explanatory view showing the maximum rugged difference of a sliding surface in a case where the housing member and the vane rotor are made by die-cast molding, and in a case where a vane rotor is made by extrusion molding (first embodiment)

FIGS. 7 and 8 show the frictional coefficient in the sliding part and the maximum rugged difference of the sliding surface of the side wall inner surface of the housing member and the side of the vane rotor when the housing member and the vane rotor are subjected to the die-cast molding by ADC12 and when the housing member is subjected to the die-cast molding by ADC12 and the vane rotor is subjected to the extrusion molding by the 6000 system alloy of aluminum. The side wall inner surface of the housing member and the side surface of the vane rotor are not applied with the surface treatment such as Sn plating or coating of alumite or fluorine resin.

When the housing member and the vane rotor are subjected to die-cast molding by ADC12, the coagulation between aluminum materials tends to occur in the sliding part between the side wall inner surface of the housing member and the side surface of the vane rotor. Accordingly, the frictional coefficient becomes large, and the sliding surface becomes rough to thereby increase the maximum rugged difference. On the other hand, when the housing member is subjected to the die-cast molding by ADC12 and the vane rotor is subjected to the extrusion molding by the 6000 system alloy of aluminum, as in the first embodiment, even when the surface treatment is not applied to the sliding surface, the coagulation of the aluminum materials in the sliding part between the side wall inner surface of the housing member and the side surface of the vane rotor is reduced. Accordingly, the frictional coefficient becomes small, and the maximum rugged difference becomes small. Thereby, the process for the surface treatment of the inner side surface of the housing member 10 and the side surface of the vane rotor 15 which slide on each other is not needed.

In the valve timing adjusting apparatus, so large force as to produce the sliding burning is not applied to the sliding part between the side wall inner surface of the housing member and the side surface of the vane rotor. Accordingly, even when the housing member is subjected to the die-cast molding, the vane motor is subjected to the extrusion molding by the 6000 system alloy of aluminum, and the sliding part between the side wall inner surface of the housing member and the side surface of the vane rotor is not applied with the surface treatment, the frictional coefficient and the maximum rugged difference can be reduced as shown in FIGS. 7 and 8.

Second Embodiment

Figure 9:
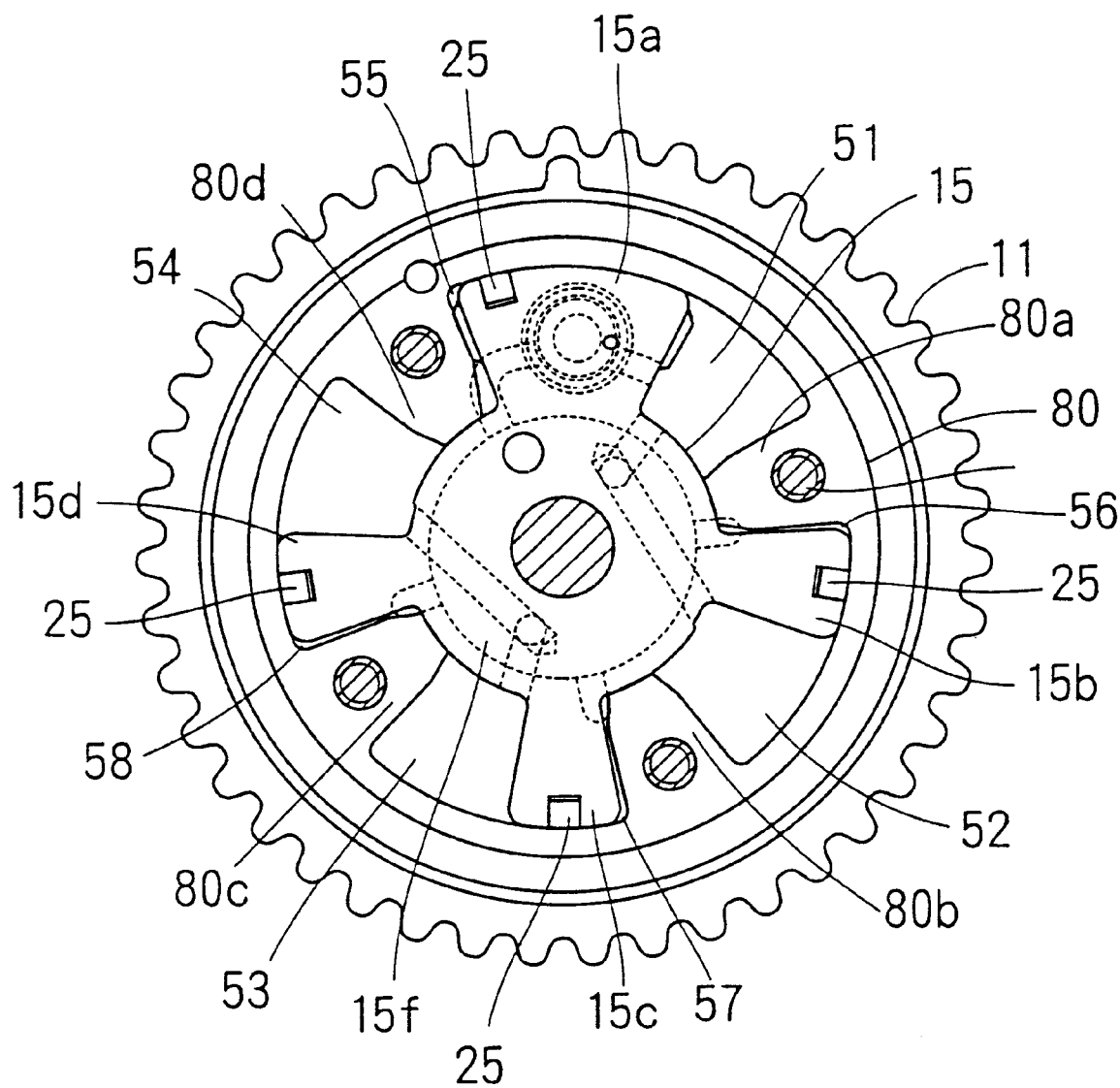
FIG. 9 is a cross-sectional view showing a valve timing adjusting apparatus (second embodiment)

A second embodiment is shown in FIG. 9. A peripheral wall 80 is formed by extrusion molding of aluminum alloy, or by die-cast molding of a peripheral wall integrally with a front plate (corresponding to the front plate 13 shown in FIG. 2 of the first embodiment). A seal member is not mounted on shoes 80a, 80b, 80c, 80d of the peripheral wall 80. Accordingly, a sliding clearance formed between each shoe and a boss part 15f is further smaller than that of the first embodiment.

Third Embodiment

Figure 10:
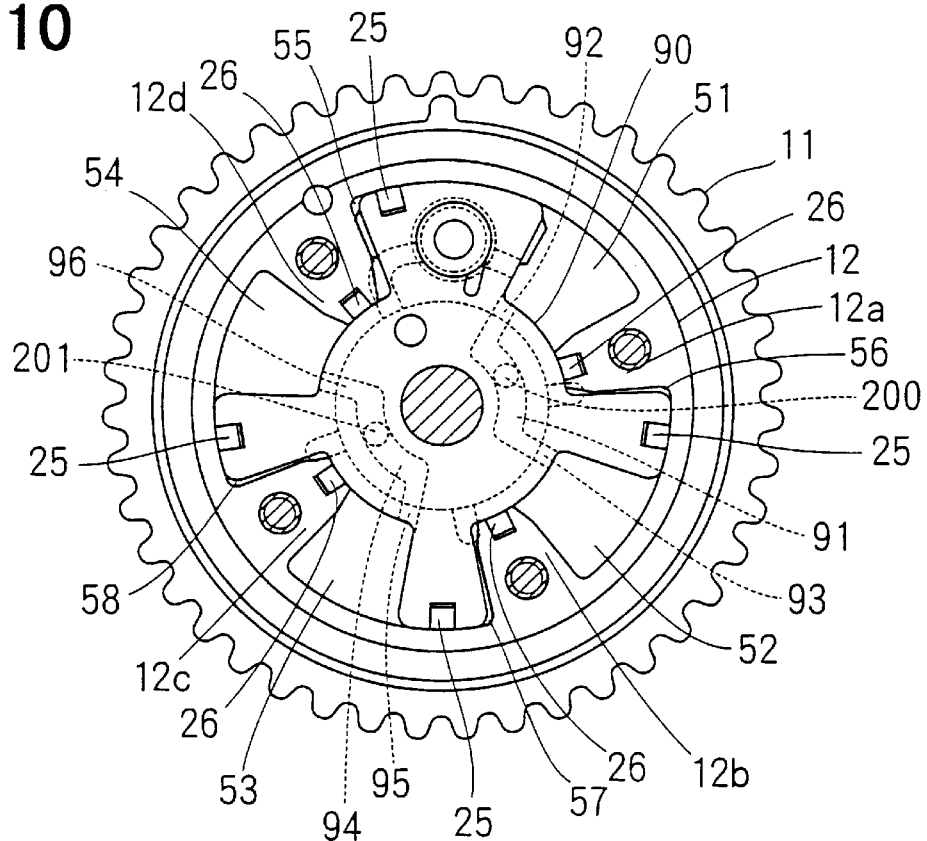
FIG. 10 is a cross-sectional view showing a valve timing adjusting apparatus (third embodiment)

FIG. 10 shows a third embodiment. Constitutions other than those explained hereinafter are substantially the same as the first embodiment.

Retard oil passages 91, 92 are formed in the outer side wall of the vane rotor 90 on the side to which the working oil is supplied from oil passages 200, 201 formed in the camshaft 2. In the third embodiment, the position of the oil passages 200, 201 formed in the camshaft 2 is slightly deviated from those of the first embodiment. The retard oil passage 91 has distribution oil passages 92, 93, and communicates with the oil passage 200. The distribution oil passage 92 and the distribution oil passage 93 communicate with the retard hydraulic chamber 51 and the retard hydraulic chamber 52, respectively. The retard oil passage 94 has distribution oil passages 95, 96, and communicates with the oil passage 201. The distribution oil passage 95 and the distribution oil passage 96 communicate with the retard hydraulic chamber 53 and the retard hydraulic chamber 54, respectively. The distribution oil passages 92, 93, 95, 96 are opened to the roots of the vanes.

In the third embodiment, the retard oil passage capable of supplying the working oil to each retard hydraulic chamber is formed in the outer side wall of the vane rotor 90 on the side to which is supplied working oil from the camshaft. Since there is no need to form an oil passage in locations other than the outer wall side of the vane rotor 90, if the vane rotor having the retard oil passage is formed by sintering, the number of steps of cutting the retard oil passage by a drill or the like to form it can be omitted. The base material of the peripheral wall 12 is formed by extrusion molding an aluminum alloy.

Fourth Embodiment

Figure 11:
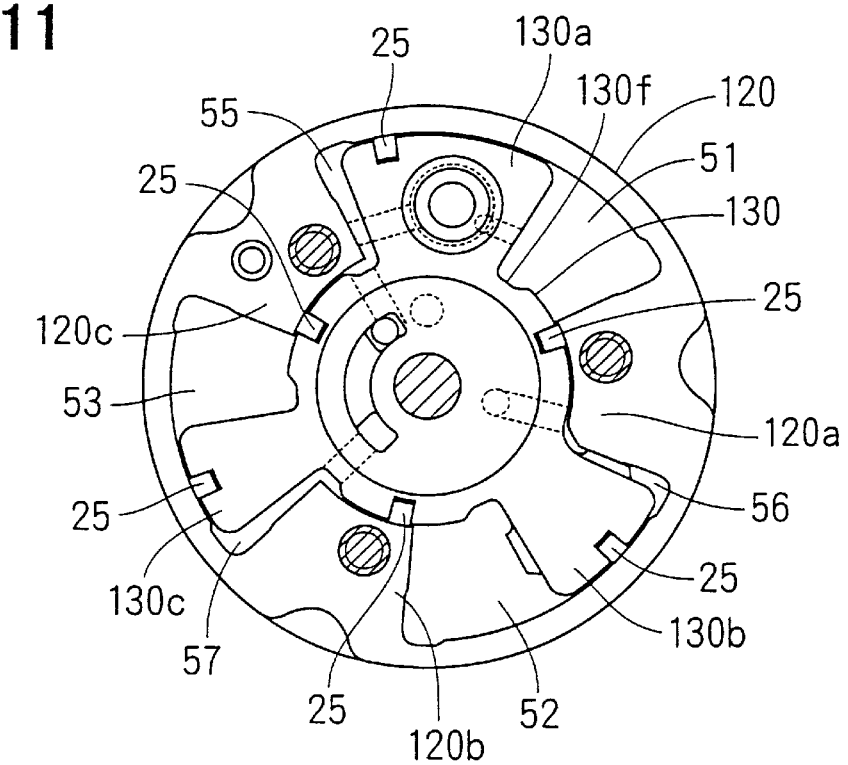
FIG. 11 is a cross-view showing a valve timing adjusting apparatus (fourth embodiment)

FIG. 11 shows a fourth embodiment. A peripheral wall 120 is formed by extrusion molding of aluminum alloy, or by die-cast molding integrally with a front plate (corresponding to the front plate 13 shown in FIG. 2 of the first embodiment). A vane rotor 130 is formed by extrusion molding an aluminum alloy. All seal members 25 provided in a sliding clearance between the inner wall of the peripheral wall 120 and the vane rotor 130 are mounted in vanes 130a, 130b, 130c radially facing the inner wall and mounted in the outer peripheral wall of a boss portion 130f. The inner wall of the peripheral wall 120 slidably moving with the seal member 25 is enhanced in hardness by alumite process, plating process or heat treatment.

Fifth Embodiment

Figure 12:
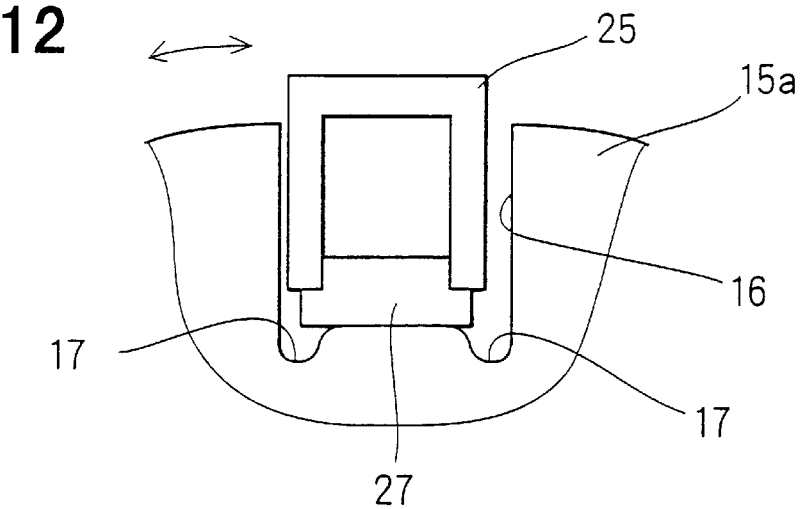
FIG. 12 is a schematic view showing a housing groove (fifth embodiment)

A fifth embodiment of the present invention is shown in FIG. 12. Those other than the shape of the housing groove 16 are substantially the same as the first embodiment. The seal member 25 and the plate spring 27 as bias means are housed in the housing groove 16 formed in the vane 15a. The plate spring 27 biases the seal member 25 toward the inner peripheral surface of the peripheral wall 12 radially. At both sides of bottom corners of the housing groove 16, concaves 17 recessed more than a right-angle corner are formed. The concaves 17 extend in the axial direction of the vane 15a and radially toward the center of the vane rotor 15. When the vane rotor 15 is relatively rotated in the direction of an arrow with respect to the housing member 10, the seal member 25 and the plate spring 27 are also moved in the direction of an arrow within the housing groove 16. Since the bottom corner of the housing groove 16 has the concave 17, the seal member 25 and the plate spring 27 can be moved without being inclined to both sides indicated by the arrow within the housing groove 16. Accordingly, the seal member 25 firmly seals the hydraulic chambers on both sides in the rotational direction with the seal member 25 put therebetween. The vanes other than the vane 15a and the shoes are also provided with the same-shaped housing groove 16 in which the seal member 26 and the plate spring 27 are installed.

Figure 13:
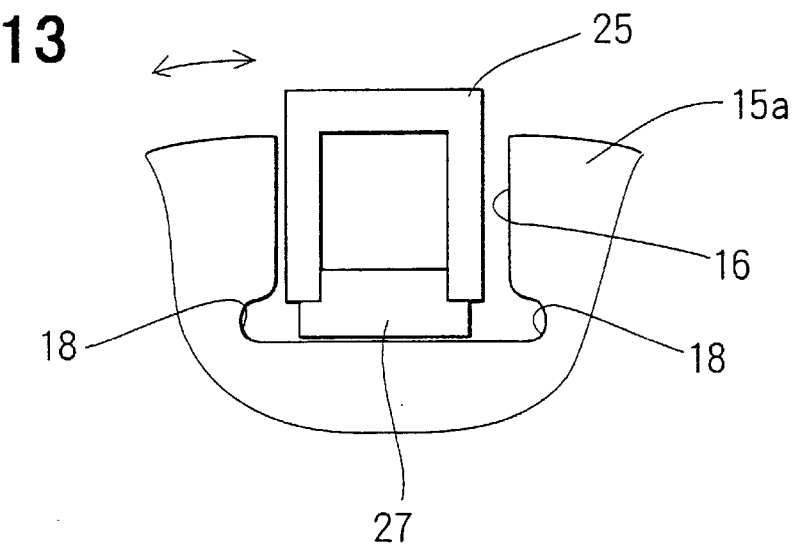
FIG. 13 is a schematic view showing a housing groove in a modification (fifth embodiment)

In a modification of the fifth embodiment shown in FIG. 13, on both sides of bottom corners of the housing groove 16 are formed in a concave 18 recessed more than a right-angle corner part. The concave 18 extends in the axial direction of the vane 15a, and is recessed in the rotational direction of the vane rotor 15.

Figure 14:
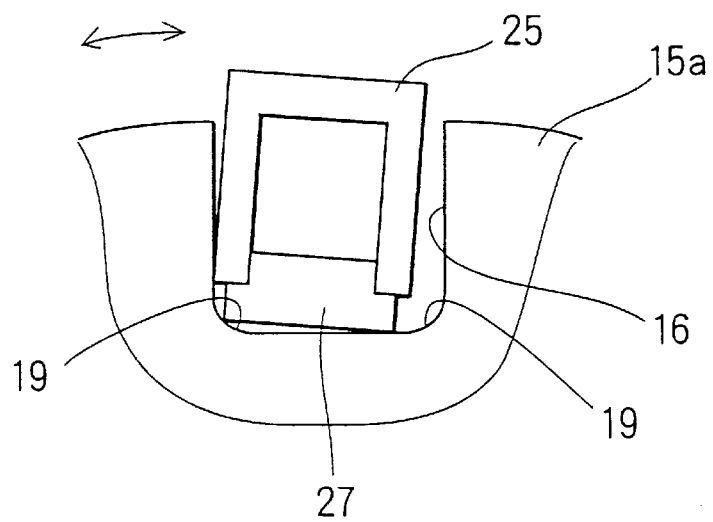
FIG. 14 is a schematic view showing a housing groove in a comparative example (fifth embodiment)
Figure 15A:
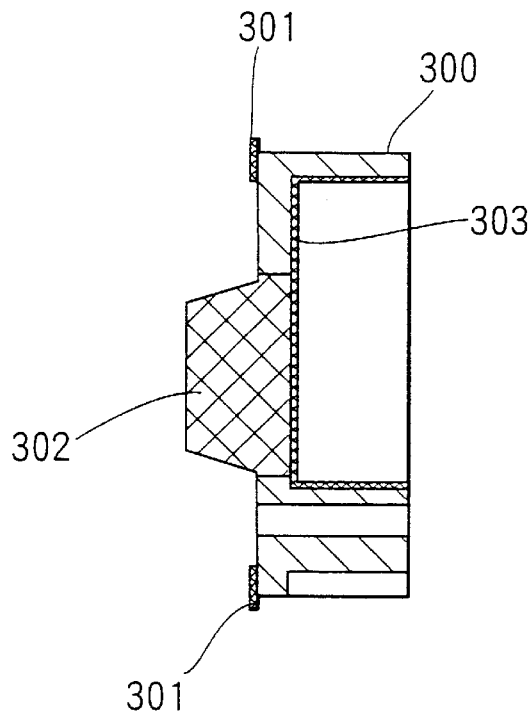
FIGS. 15A and 15B are schematic cross-sectional views showing a portion removed of a die-cast molded article, where.
Figure 15B:
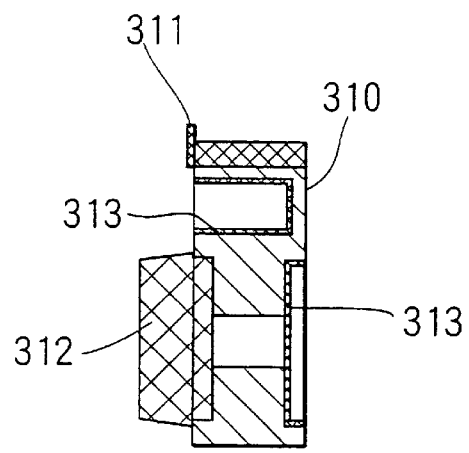
Figure 16A:
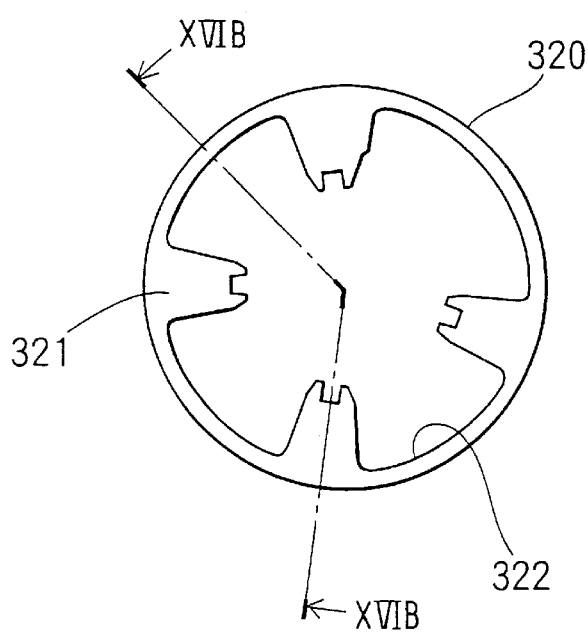
FIGS. 16A and 16B are views showing a portion removed of a forge-molded article of a housing member, where
Figure 16B:
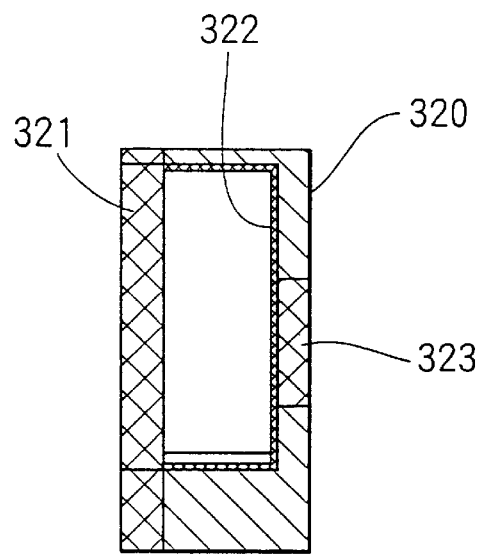
Figure 17A:
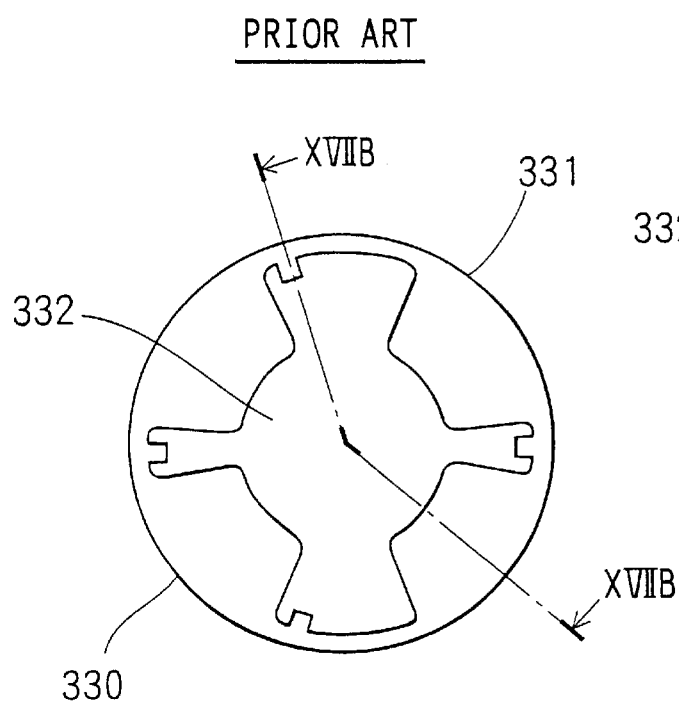
FIGS. 17A and 17B are views showing a portion removed of a forge-molded article of a vane rotor, where
Figure 17B:
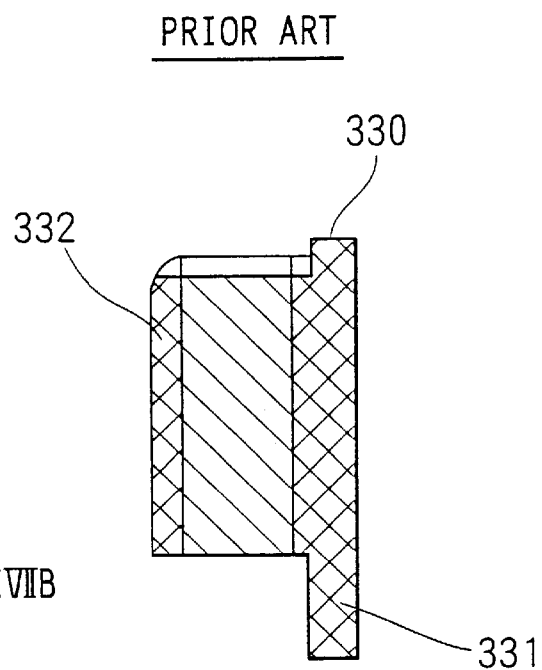

In comparison with the fifth embodiment and the modification thereof, in a comparative example shown in FIG. 14, both sides of a bottom corner part 19 of the housing groove 16 are rounded. When the seal member 25 and the plate spring 27 are moved in the direction of an arrow within the housing groove 16, the plate spring 27 might ride on the bottom corner part 19 so that the seal member 25 is inclined. Then, the working oil possibly leaks between the hydraulic chambers on both sides in the rotational direction with the seal member 25 while passing around the seal member 25. If the bottom corner part of the housing groove 16 is designed to be a right angle corner part, the plate spring can be prevented from riding on the bottom corner part. However, for making the bottom corner part of the housing groove 16 to be a right angle part by extrusion molding, it is necessary for an extrusion molding mold for molding the bottom corner part of the housing groove 16 to have a convex right angle corner part. However, when the extrusion molding mold has the convex right angle corner part, the right angle corner part tends to wear, thereby shortening the life of the extrusion molding mold.

In the above-described embodiments, the base material of at least one of the peripheral wall of the housing member and the vane rotor is formed by extrusion molding, thereby reducing the cutting amount as compared with the case of molding by way of forging or die-casting. Accordingly, the manufacturing time is shortened, and the wastefulness of material can be reduced.

Further, the extrusion molded article of at least one of the peripheral wall of the housing member and the vane rotor is cut to the desired length, so that the volume of the retard hydraulic chamber and the advance hydraulic chamber can be adjusted by the same extrusion mold. Accordingly, the torque for relatively rotating and driving the vane rotor with respect to the housing member can be set easily.

Modifications

In the above-described embodiments, the valve timing adjusting apparatus is used for driving the intake valve. Alternatively, the valve timing adjusting apparatus may be used for driving an exhaust valve, or used for driving both intake valve and exhaust valve.

In the above-described embodiments, the stopper piston is moved in the axial direction and fitted in the fitting ring. Alternatively, the stopper piston may be moved in the radial direction and fitted in the fitting ring.

In the above-described embodiments, the rotational driving force of the crank-shaft is transmitted by the chain sprocket. Alternatively, a timing pulley or a timing gear may be used. Further, the driving force of the crank-shaft may be received by a vane member, and a camshaft and a housing member may be rotated integrally.

What is claimed is:

1. A method for manufacturing a valve timing adjusting apparatus, said valve timing adjusting apparatus installed in a driving force transmitting system for transmitting a driving force from a driving shaft of an internal combustion engine to a driven shaft for opening and closing at least one of an intake valve and an exhaust valve, and adjusts the opening-closing timing of at least either one of the intake valve or the exhaust valve, said valve timing adjusting apparatus including:

a housing member rotating with said driving shaft, said housing member having a peripheral wall and side walls connected to said peripheral wall at axial both sides thereof, said peripheral wall and said side walls forming a housing chamber; and a vane member rotating together with said driven shaft, said vane member having a vane housed in said housing chamber, said vane member driven to rotate by a fluid pressure with respect to said housing member;

the method for manufacturing the valve timing adjusting apparatus comprising the steps of:

extrusion molding light metal to form an extrusion molded article of at least one of said peripheral wall and said vane member; and cutting said extrusion molded article to a desired length.

2. A method for manufacturing a valve timing adjusting apparatus according to claim 1, wherein said light metal is aluminum alloy.

3. A method for manufacturing a valve timing adjusting apparatus according to claim 2, wherein said valve timing adjusting apparatus includes a seal member mounted on an outer peripheral wall of said vane member, said seal member slides on an inner wall of said peripheral wall to prevent leaking of working fluid, an aluminum alloy is extrusion molded to form an extrusion molded article for said vane member, and the method further comprises a step of die-cast molding a base material for said peripheral wall and one of said side walls integrally.

4. A method for manufacturing a valve timing adjusting apparatus according to claim 3, wherein said vane member is made of 6000 system alloy of an Al—Mg—Si system alloy, and said peripheral wall and one of said side walls are made of ADC12.

5. A method for manufacturing a valve timing adjusting apparatus according to claim 3, wherein said valve timing adjusting apparatus further includes a biasing means for pressing said seal member toward a sliding surface, the method further comprising:

extrusion molding to form a housing groove for housing the seal member and a biasing member for biasing the seal member on the peripheral wall or the vane member, the housing groove being formed with a corner having a concave portion recessed more deeply than an imaginary angled corner.

6. A method for manufacturing a valve timing adjusting apparatus according to claim 2, wherein said peripheral wall has partitions projecting toward a rotational center and arranged in a rotational direction, and said housing chamber is formed between each of the adjacent partitions, said valve timing adjusting apparatus further includes seal members mounted on a radial inner peripheral wall of said peripheral wall facing said vane and on a radial outer peripheral wall of said vane facing said inner peripheral wall of said peripheral wall, for preventing leaking of the working fluid, aluminum alloy is extrusion molded to form an extrusion molded article of the vane member, before or after the cutting, hardness of a sliding part with the seal member of said extrusion molded article of said vane member is made more than HRB45, and a base material of said peripheral wall and one of said side walls is integrally die-casting molded.

7. A method for manufacturing a valve timing adjusting apparatus according to claim 6, wherein T6 heat treatment is applied to said extrusion molded article to make the hardness of the sliding part with said seal member of the extrusion molded article more than HRB45.

8. A method for manufacturing a valve timing adjusting apparatus according to claim 6, wherein an alumite treatment is applied to said extrusion molded article to make the hardness of the sliding part with said seal member of the extrusion molded article more than HRB45.

9. A method for manufacturing a valve timing adjusting apparatus according to claim 2, wherein said peripheral wall has partitions projecting toward a rotational center and arranged in a rotational direction, and said housing chamber is formed between each of the adjacent partitions, said valve timing adjusting apparatus further includes seal members mounted on a radial inner peripheral wall of said peripheral wall facing said vane and on a radial outer peripheral wall of said vane facing said inner peripheral wall of said peripheral wall, for preventing leaking of the working fluid, aluminum alloy is extrusion molded to form extrusion molded articles of said vane member and the peripheral wall, and before or after the cutting, hardness of a sliding part with the seal member of said extrusion molded articles of said vane member and said peripheral wall more than HRB45.

10. A method for manufacturing a valve timing adjusting apparatus according to claim 2, wherein the aluminum alloy is 6000 system alloy of an Al—Mg—Si system alloy.

11. A method for manufacturing a valve timing adjusting apparatus according to claim 2, wherein said peripheral wall has partitions projecting toward a rotational center and arranged in a rotational direction, and said housing chamber is formed between each of the adjacent partitions, said partitions slide on a radial outer peripheral wall of said vane to prevent leaking of the working fluid, said valve timing adjusting apparatus further includes seal members mounted on the radial outer peripheral wall of said vane facing an inner peripheral wall of said peripheral wall, for preventing leaking of the working fluid, and aluminum alloy is extrusion molded to form extrusion molded articles of the vane member and the peripheral wall.

12. A method for manufacturing a valve timing adjusting apparatus according to claim 11, wherein before or after the cutting, hardness of a sliding part of the inner peripheral wall of said peripheral wall and the outer peripheral wall of said vane member is made more than HRB45.

13. A method for manufacturing a valve timing adjusting apparatus according to claim 11, wherein before or after the cutting, an alumite treatment is applied to a sliding part of the inner peripheral wall of said peripheral wall and the outer peripheral wall of said vane member.

14. A method for manufacturing a valve timing adjusting apparatus according to claim 2, wherein said peripheral wall has partitions projecting toward a rotational center and arranged in a rotational direction, and said housing chamber is formed between each of the adjacent partitions, said partitions directly slide on a radial outer peripheral wall of said vane to prevent leaking of the working fluid, said valve timing adjusting apparatus further includes seal members mounted on the radial outer peripheral wall of said vane facing an inner peripheral wall of said peripheral wall, for preventing leaking of the working fluid, and aluminum alloy is extrusion molded to form extrusion molded articles of the vane member, and a base material for said peripheral wall and one of said side walls is integrally die-casting molded.

15. A method for manufacturing a valve timing adjusting apparatus according to claim 14, wherein before or after the cutting, hardness of a sliding part of the outer peripheral wall of said vane member is made more than HRB45.

16. A method for manufacturing a valve timing adjusting apparatus according to claim 14, wherein before or after the cutting, an alumite treatment is applied to a sliding part of the outer peripheral wall of said vane member.

17. A method for manufacturing a valve timing adjusting apparatus according to claim 2, wherein at least one of an inner surface of the peripheral wall and an outer surface of the vane member radially facing one another and being formed into a final shape in the extrusion molding step without performing a cutting process on the inner or outer surface after the extrusion molding step.

\* \* \* \* \*

UNITED STATES PATENT AND TRADEMARK OFFICE
CERTIFICATE OF CORRECTION

PATENT NO. : 6,615,487 B2  
DATED : September 9, 2003  
INVENTOR(S) : Iwasaki et al.

It is certified that error appears in the above-identified patent and that said Letters Patent is hereby corrected as shown below:

<u>Title page,</u>
Item [*] Notice, delete "0" and insert -- 37 --.

Signed and Sealed this

Twenty-fifth Day of October, 2005

JON W. DUDAS
*Director of the United States Patent and Trademark Office*